United States Patent [19]
Field et al.

[11] 3,863,003
[45] Jan. 28, 1975

[54] METHOD OF REMOVING CARBON DIOXIDE FROM GASES

[75] Inventors: Joseph H. Field; Donald H. McCrea, both of Pittsburgh, Pa.

[73] Assignee: The Benfield Corporation, Berwyn, Pa.

[22] Filed: Sept. 6, 1973

[21] Appl. No.: 394,637

[52] U.S. Cl................................. 423/232, 423/269
[51] Int. Cl........................................... B01d 53/34
[58] Field of Search ............... 423/232, 269; 21/2.7

[56] References Cited
UNITED STATES PATENTS 3,181,929  4/1965  Field et al........................... 423/232
3,721,526  3/1973  Foroults et al.................. 423/232 X

*Primary Examiner*—Earl O. Thomas
*Attorney, Agent, or Firm*—William M. Epes

[57] ABSTRACT

The corrosive action of alkali metal carbonate solutions, particularly relatively concentrated potassium carbonate solutions, on steel surfaces when used as scrubbing agents for absorbing $CO_2$ and other slightly acidic gases from $CO_2$ containing gas mixtures, is inhibited by including in the scrubbing solutions small amounts of a metal vanadate salt and a metal nitrite salt.

7 Claims, No Drawings

METHOD OF REMOVING CARBON DIOXIDE FROM GASES

BACKGROUND OF INVENTION AND PRIOR ART

This invention relates to a method for inhibiting the corrosion of steel surfaces by aqueous alkali carbonate solutions when used as scrubbing agents for absorbing $CO_2$ and other slightly acidic gases from gas mixtures.

The tendency for corrosive attack on mild steel and many alloy steel surfaces by alkali metal carbonate solutions when used for scrubbing $CO_2$ containing gases is of course well known and a number of agents for inhibiting such corrosion have been suggested. Metal vanadate salts, as described for example in U.S. Pat. No. 3,181,929 of Joseph H. Field et al., have been shown to be effective corrosion inhibitors for such scrubbing solutions and are widely used in large commercial plants particularly in systems involving the absorption of $CO_2$ by hot aqueous solutions of potassium carbonate. Other corrosion inhibitors that are quite effective and have been used commercially for the inhibition of potassium carbonate scrubbing solutions are the alkali metal chromates and dichromates. These latter materials however suffer from several disadvantages, such as the tendency to form precipitates which deposit in the scrubbing system, and have been largely displaced by the vanadate inhibitors in commercial applications.

A large number of other corrosion inhibitors have also been investigated for alkali metal carbonate scrubbing solutions for this type of use as reported for example in U.S. Department of the Interior, Bureau of Mines, Report of Investigations 5979 entitled Corrosion Study of the Hot Carbonate System by D. Bienstock, J. H. Field and J. G. Myers (1962). As described in that Report of Investigations, the effectiveness of potassium nitrite as a corrosion inhibitor in such systems was investigated and it was found that the behavior of potassium nitrite was highly erratic. Some of the corrosion coupons underwent very high rates of corrosion and in fact completely disappeared while other of the coupons gained weight. Further testing in the course of investigations relating to this invention has confirmed that potassium nitrite is not effective in preventing the attack on steel surfaces of alkali metal carbonate solutions used in $CO_2$ scrubbing applications.

GENERAL DESCRIPTION OF INVENTION AND PREFERRED EMBODIMENTS

It has now been found in accordance with this invention that despite the ineffectiveness of potassium nitrite as a corrosion inhibitor when employed by itself in alkali metal carbonate solutions used as scrubbing agents for $CO_2$ containing gases, the combination of a small amount of potassium nitrite (or other dissolved metal nitrite salt) and a small amount of a vanadate salt produces an inhibitor system which is highly superior to one containing only the vanadate salt. As pointed out above, the vanadate salts are relatively effective ihibitors by themselves and have enjoyed extensive commercial use. However, in many cases under practical plant operating conditions they have not provided completely effective corrosion protection. One particularly significant condition that appears to interfere substantially with the effectiveness of the vanadate inhibitors is the presence of dissolved iron, e.g. in the ferrous or ferric form in the scrubbing solution. Such dissolved iron may enter the scrubbing system in various ways. It may for example be carried into the system with the feed gas in the form of millscale or other iron compounds. It may be formed in the scrubbing system itself as a result of localized corrosion occurring for example as a result of exposure of steel surfaces to steam-$CO_2$ mixtures which are not fully wetted by the solution and accordingly are not protected by the vanadate inhibitor dissolved in the solution. There is evidence also that other impurities introduced or generated in the scrubbing solution such for example as dissolved thiosulfates, e.g. potassium thiosulfate, may interfere in some way with the effectiveness of the vanadate salts in providing effective corrosion inhibition. It has been found that while neither the vanadate salt nor the nitrite salt alone gives reliable protection under such adverse conditions, the combination of a small amount of both of these components provides highly effective corrosion protection as will be illustrated by the examples which follow.

While the mechanism through which this combination of inhibitors provides enhanced corrosion protection is not fully understood, and while the invention is not limited to, nor depends upon, an understanding of this mechanism, it is believed that the presence of the nitrite salt in some way accelerates the formation of the very thin passivating layer that builds up on the steel surfaces exposed to the solution during operation of the scrubbing system. It is believed that this thin passivating layer, probably containing vanadium and iron compounds, and usually metallic grey in color, is primarily responsible for the corrosion inhibiting effect of the vanadate salt. It is believed that the nitrite salt in combination with the vanadate salt in some way promotes the formation of this layer particularly under adverse conditions often existing in commercial plants, such as the presence of dissolved iron or other impurities in the solution. The vanadate salt may in general be a metal salt of a vanadium oxy acid at least slightly soluble in the alkali metal carbonate scrubbing solution. The vanadium oxy acids exist in various forms, the most common of which are metavanadic acid, $HVO_3$, and pyrovanadic acid $H_4V_2O_7$.

It is generally preferable not to introduce extraneous metal ions into the alkali metal carbonate scrubbing solution and accordingly the alkali metal vanadate salts are highly preferred, particularly the sodium and potassium vanadates. In the case of potassium carbonate scrubbing solutions the potassium vanadates are preferred. Examples of specific preferred vanadate salts are potassium metavanadate, $KVO_3$; potassium pyrovanadate, $K_4V_2O_7$; sodium metavanadate, $NaVO_3$; or sodium pyrovanadate, $Na_4V_2O_7$. Such salts may be added to the scrubbing solution as such or formed in situ by adding a soluble vanadium oxide whereupon the vanadium salt forms by reaction of the oxide with the alkali metal carbonate. For example, when adding $V_2O_5$ to a potassium carbonate solution, potassium vanadate forms as follows:

$$K_2CO_3 + V_2O_5 \rightarrow 2KVO_3 + CO_2$$

Also, the vanadium salt can be formed by adding ammonium vanadate $NH_4VO_3$, whereupon the metal vanadate forms by reaction with the alkali metal carbonate as follows:

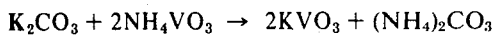

The exact form in which the vanadate salts exist in the scrubbing solution under operating conditions is not known with certainty. There is evidence, for example, that under some circumstances they may exist in several valence forms, such as the pentavalent form, e.g. potassium metavanadate, $KVO_3$, or other lower valence forms such as the tetravalent or trivalent forms or mixtures of various valence forms.

The nitrite salt may in general be a metal nitrite at least slightly soluble in the alkali metal carbonate solution. As stated above, it is preferable not to introduce extraneous metal ions into the alkali metal carbonate scrubbing solution and accordingly the alkali metal nitrites, particularly potassium nitrite, $KNO_2$, and sodium nitrite, $NaNO_2$, are highly preferred. In the use of potassium carbonate scrubbing solutions, potassium nitrite is preferred. The alkali metal nitrite may be added to the scrubbing solution as such or formed in situ such as by adding ammonium nitrite, $NH_4NO_2$, whereupon the metal nitrite forms by reaction of the ammonium nitrite with the alkali metal carbonate as follows:

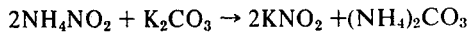

In general, the inclusion of only a small amount of the vanadate salt and the nitrite salt in the scrubbing solution will provide highly effective corrosion inhibition. In the case of the vanadate salt concentrations ranging from as little as 0.01% by weight to about 2% by weight based on the total weight of the scrubbing solution will be used. (All concentrations of the metal vanadate salt and the metal nitrite salt are expressed herein as the weight percent concentration of the salt in the alkali metal carbonate scrubbing solution as used in actual operation of the scrubbing system based on the total weight of the scrubbing solution). Preferably the concentration of the vanadate salt will range from 0.1% to about 1%. While there is no critical upper limit in the amount of vanadate salt that may be used, generally amounts larger than 2% by weight do not provide substantially enhanced corrosion inhibition and because of the relatively high cost of the vanadate salts it is generally advantageous to limit the amount employed to about 2% by weight or lower.

In the case of the nitrite salt, similar concentrations ranging from as little as 0.01% by weight to about 2% by weight will be used although in general, the nitrite salt will be used in smaller concentrations than the vanadate salt. Preferred concentrations of the metal nitrite accordingly will generally range from about 0.05% to 0.5% with the concentration of the nitrite salt usually ranging from one-half to one-tenth (or even a smaller proportion) of the concentration of the vanadate salt.

In the corrosion inhibitor system of this invention using a combination of a vanadate salt and a nitrite salt, the concentration of the vanadate salt in the scrubbing solution is preferably maintained at a relatively steady level while it is not essential in the case of the nitrite salt to maintain a continuous or steady concentration of the nitrite. Thus if desired, the nitrite may be added intermittently with larger amounts being added particularly during periods of rising concentration of extraneous material, such as dissolved iron, in the solution.

In general, the use of a small amount of the relatively inexpensive nitrite salt will permit effective corrosion protection to be more reliably obtained with a reduced concentration of the much more expensive vanadate salt. Thus, the use of the nitrite and vanadate salts in combination not only provides a more effective and reliable corrosion inhibition system, but also reduces the overall cost of the inhibitor system.

The corrosion inhibitor system of the invention is generaly applicable for preventing the corrosion of steel surfaces in scrubbing systems for the absorption of carbon dioxide from carbon dioxide-containing gases which utilize alkali metal carbonate scrubbing solutions as the absorbent. Such scrubbing systems involve an absorption stage where the $CO_2$ is absorbed in the scrubbing solution and a regeneration stage where the solution is regenerated by the stripping out of the $CO_2$, usually by steam stripping, with the solution being continuously circulated between the absorption and regeneration stages. In addition to the alkali metal carbonate which acts as the principal active absorbent material, the alkali metal carbonate scrubbing solutions may also contain minor amounts of other components such as so-called activators, for example minor amounts of amine compounds, e.g., ethanolamines or glycine, or alkali metal borates.

In addition to the carbon dioxide, which is primarily responsible for producing corrosion in alkali metal carbonate scrubbing systems, the gases treated may also contain other slightly acidic gases such as hydrogen sulfide and small amounts of other materials such as carbonyl sulfides, thiophenes, mercaptans and other organic sulfur compounds. The corrosion inhibitor system of the invention operates effectively in the presence of small amounts of such components. $CO_2$ containing gases which also contain substantial amounts of hydrogen sulfide (e.g., over 0.5% by volume), or materials such as COS tending to produce hydrogen sulfide by hydrolysis in similar amounts, generally do not require a corrosion inhibitor since the presence of the substantial amount of hydrogen sulfide tends to provide effective corrosion inhibition.

The invention is particularly applicable to the so-called hot carbonate scrubbing systems utilizing relatively concentrated aqueous solution of potassium carbonate in which the absorption takes place under substantial superatmospheric pressure and in which at least the major portion of the absorption takes place at temperatures in the vicinity of the atmospheric boiling temperature of the solution. In such systems because of the elevated absorption pressures and relatively high absorption temperatures (usually in the range of from 100°C to 140°C) and because relatively concentrated potassium solutions are employed (usually in the range of 20% to 40% $K_2CO_3$ by weight), the tendency for corrosive attack on steel surfaces is particularly high, and the requirements for an effective corrosion inhibitor system are particularly demanding. Such hot carbonate scrubbing systems are described, for example, in U.S. Patent 2,886,405 of Homer E. Benson and Joseph H. Field.

SPECIFIC EXAMPLES

The following examples illustrate the superiority of the corrosion inhibiting system of the invention. In these examples, the corrosive effect of potassium carbonate scrubbing solutions saturated with carbon dioxide at 100°C on mild carbon steel surfaces was measured. All corrosion rate measurements were made using an instrument manufactured by the Petrolite Corporation of Houston, Tex., which is designed to measure the corrosion rate of an electrode inserted into a solution directly in mills per year (MPY). The instrument utilizes the PAIR or Polarization Admittance Instantaneous Rate technique which is based on the fact that the rate at which a metal is consumed by electrochemical corrosion is directly proportional to the electrical current produced. The principles of the technique and the equipment employed have been described, for example, by R. R. Annand "An Investigation of the Utility of Instantaneous Corrosion Rate Measurements for Inhibitor Studies", CORROSION, Volume 22, page 215–228, August 1966.

EXAMPLE 1

A sample of an aqueous potassium carbonate scrubbing solution from a large commercial scrubbing plant used for the removal of $CO_2$ from a gas containing about 20% $CO_2$ and 80% hydrogen had the following analysis:

| Component | Concentration |
| --- | --- |
| $K_2CO_3$ | 22.7 wt.% * |
| $KHCO_3$ | 3.7 wt.% * |
| Diethanolamine | 1.6 wt.% * |
| Potassium Vanadate | 1.5 wt.% * |
| Dissolved Iron | 72.4 ppm ** |
| Water | Remainder |

*Weight percent based on total weight of solution.
**Parts per million by weight.

The above sample was taken from the operating scrubbing solution after a prelonged period of use during which the indicated concentration of dissolved iron had accumulated in the solution from an unknown source. The valence state of the dissolved iron was determined to be 60% $Fe^{+2}$ and 40% $Fe^{+3}$. The valence state of potassium vanadate was measured and it was found that the vanadium was about 99% in the pentavalent state with about 1% in the tetravalent state. Despite the relatively high concentration of potassium vanadate in the solution, it was found that the corrosion rate of this solution on unpassivated mild carbon steel was unacceptably high, namely 130 mills per year (MPY). The corrosion measurement was made in the corrosimeter described above with the test electrode consisting of unpassivated mild carbon steel immersed in the above solution maintained at 100°C and saturated with $CO_2$ at atmospheric pressure. In addition to the high corrosion rate, it was also observed that the test electrode did not assume the metallic grey coloration indicative of formation of the passivating vanadium containing film and the electrode continued to corrode in the presence of the potassium vanadate. When 200 parts per million (ppm) of potassium nitrite, $KNO_2$, was added to the solution, the corrosion rate quickly dropped to 13 MPY and the grey coloration characteristic of the normal passivation layer appeared on the surface of the test electrode. The corrosimeter reading of 13 MPY measured for the combination of the potassium vanadate and potassium nitrite inhibitors is typical of measurements obtained in a properly passivated system using this type of instrument.

EXAMPLE 2

The results obtained in Example 1 with a solution sample taken from a commercial $CO_2$ scrubbing plant were confirmed for a similar laboratory-prepared solution sample. The initial solution was prepared without inhibitors and had the following composition:

| Component | Concentration |
| --- | --- |
| $K_2CO_3$ | 29.1 wt.% |
| Diethanolamine | 2.9 wt.% |
| Water | Remainder |

The corrosion rate of the above solution, while maintained at 100°C and saturated with $CO_2$ by bubbling $CO_2$ through the solution at atmospheric pressure (causing about 35% of the potassium carbonate to be converted to potassium bicarbonate) was measured using the type of corrosimeter described above using a mild carbon steel test electrode. The uninhibited solution had a corrosion rate of 350 MPY under these conditions. To this solution there was then added 1% by weight of vanadium pentoxide, $V_2O_5$, (which reacted to form in the solution 1.5% by weight of potassium vanadate) plus 272 ppm of ferrous sulfate, $FeSO_4$, equivalent to 100 ppm of $Fe^{++}$. Despite the presence of the relatively large amount of the vanadate inhibitor, the corrosion rate remained at 350 MPY and the characteristic coloration indicating passivation did not appear on the mild carbon steel test electrode. There was then added 1,000 ppm (0.1% by weight) of potassium nitrite, $KNO_2$, and the corrosion rate fell to 12 MPY and the normal passivation color appeared on the surface of the test electrode. Examples 1 and 2 thus illustrate that while the vanadate inhibitor was ineffective as a corrosion inhibitor by itself in the presence of dissolved iron, when both the vanadate salt and the nitrite salt were present in combination, highly effective corrosion inhibition was obtained.

EXAMPLE 3

To test the corrosion inhibiting properties of potassium nitrite by itself, the following test solutions were prepared.

| Solution A | |
| --- | --- |
| Component | Concentration |
| $K_2CO_3$ | 30% by wt. |
| Diethanolamine | 3% by wt. |
| Potassium Nitrite | 0.04% by wt. |
| Water | Remainder |

| Solution B | |
| --- | --- |
| Component | Concentration |
| $K_2CO_3$ | 30% by wt. |
| Diethanolamine | 3% by wt. |
| Potassium Nitrite | 0.4% by wt. |
| Water | Remainder |

The corrosion rate of these solutions were observed by immersing a mild carbon steel test strip in these solutions while maintaining the solutions at 100°C and while saturating the solutions with $CO_2$. Rapid severe corrosion of the mild carbon steel test strip could be observed visually as well as the presence of precipitated iron in the test solutions. This severe corrosion occurred both at the 0.04% (400 ppm) level of potassium nitrite as well as the 0.4% (4,000 ppm) level. The results obtained in these tests, showing the complete ineffectiveness of potassium nitrite as a corrosion inhibitor when used by itself, confirm the results obtained in corrosion tests reported by Bienstock, Field and Myers in Bureau of Mines Report of Investigations 5979 referred to above.

EXAMPLE 4

A sample of an aqueous potassium carbonate scrubbing solution from a large commercial scrubbing plant used for the removal of $CO_2$ from natural gas containing about 12% $CO_2$ and traces of $H_2S$ had the following analysis:

| Component | Concentration |
|---|---|
| $K_2CO_3$ | 15.4 wt. % |
| $KHCO_3$ | 15.2 wt. % |
| Diethanolamine | 4.2 wt. % |
| Potassium Vanadate | .55 wt. % |
| Dissolved Iron | 59 ppm |
| Potassium Thiosulfate | 0.55 wt. % |
| Water | Remainder |

The above sample was taken from the operating scrubbing solution after a substantial period of use during which the indicated concentration of dissolved iron and potassium thiosulfate had accumulated in the solution. It is believed the iron was largely carried into the solution with the raw feed gas and that the potassium thiosulfate resulted from the interaction with the solution of trace components contained in the feed gas. Despite the relatively high concentration of potasium vanadate, it was found that the corrosion rate of this solution on unpassivated mild carbon steel was very high, viz. about 475 MPY when tested as described in Eample 1. As in previous tests, no grey coloration formed on the mild steel test electrode. When 3,000 ppm (0.3 wt.%) of potassium nitrite was added the passivating film formed and the corrosion rate dropped from 475 MPY to 15 MPY.

It is to be understood of course that other embodiments of the invention in addition to those described herein are included within the scope of the invention.

We claim:

1. In a process for the removal of $CO_2$ from $CO_2$ containing gases by absorption in aqueous potassium carbonate scrubbing solutions, a method for protecting the steel surfaces in contact with said scrubbing solution from corrosive attack which comprises including in said scrubbing solutions from about .01% to 2% by weight of an alkali metal vanadate salt and from about .01% to 0.5% by weight of an alkali metal nitrite salt, such amounts being based on the total weight of the scrubbing solution.

2. A method in accordance with claim 1 in which the alkali metal vanadate salt is potassium vanadate.

3. A method in accordance with claim 1 in which the alkali metal nitrite salt is potassium nitrite.

4. A method in accordance with claim 1 in which the concentration of the alkali metal vanadate salt is in the range of from 0.1 to 1% by weight.

5. In a process for the removal of $CO_2$ from $CO_2$ containing gases by absorption in aqueous potassium carbonate scrubbing solutions containing small amounts of dissolved iron compounds, a method for protecting the steel surfaces in contact with said scrubbing solution from corrosive action which comprises including in said scrubbing solution from about .01% to 2% by weight of an alkali metal vanadate salt and from about .01% to 0.5% by weight of an alkali metal nitrite salt, such amounts being based on the total weight of the scrubbing solution.

6. A method in accordance with claim 5 in which the alkali metal vanadate is sodium or potassium vanadate and in which the alkali metal nitrite is sodium or potassium nitrite.

7. A method in accordance with claim 6 in which the vanadate salt is potassium vanadate and is present in concentration of from 0.1 to 1% by weight and in which the nitrite salt is potassium nitrite.

* * * * *